(12) United States Patent
Pilu

(10) Patent No.: US 6,940,664 B1
(45) Date of Patent: Sep. 6, 2005

(54) DOCUMENT IMAGING SYSTEM

(75) Inventor: Maurizio Pilu, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 895 days.

(21) Appl. No.: 09/786,825

(22) PCT Filed: Jul. 7, 2000

(86) PCT No.: PCT/GB00/02621

§ 371 (c)(1),
(2), (4) Date: Aug. 15, 2001

(87) PCT Pub. No.: WO01/04571

PCT Pub. Date: Jan. 18, 2001

(51) Int. Cl.[7] ............................................... G02B 9/00
(52) U.S. Cl. ...................... 359/806; 359/807; 359/804
(58) Field of Search ................................ 359/806, 804, 359/618, 807; 358/488, 466, 493

(56) References Cited

U.S. PATENT DOCUMENTS

| | | | |
|---|---|---|---|
| 4,641,972 A | 2/1987 | Halioua et al. | 356/376 |
| 4,802,759 A | 2/1989 | Matsumoto et al. | 356/376 |
| 4,948,258 A | 8/1990 | Caimi | 356/376 |
| 5,084,611 A | 1/1992 | Okisu et al. | 250/208.1 |
| 5,193,120 A | 3/1993 | Gamache et al. | 382/1 |
| 5,319,567 A | 6/1994 | Ebenstein | 364/474.34 |
| 5,416,609 A | 5/1995 | Matsuda et al. | 358/474 |
| 5,497,236 A | 3/1996 | Wolff et al. | 358/296 |
| 5,585,926 A | 12/1996 | Fujii et al. | 358/471 |
| 5,760,925 A | 6/1998 | Saund et al. | 358/497 |
| 5,764,383 A | 6/1998 | Saund et al. | 358/467 |
| 5,835,241 A | * 11/1998 | Saund | 358/488 |

FOREIGN PATENT DOCUMENTS

| | | | |
|---|---|---|---|
| DE | 195 28 244 | 2/1997 | ............ H04N/1/04 |
| EP | 0974811 A1 | 1/2000 | ........... G01B/11/24 |
| WO | WO 91/15732 | 10/1991 | ........... G01B/11/24 |
| WO | WO 95/13520 | 5/1995 | ........... G01B/11/24 |

OTHER PUBLICATIONS

Wolberg, George, "Digital Image Warping," IEEE Computer Society Press, Third Edition (1994), pp. 222–231.

PCT International Search Report, PCT/GB00/02621, filed Jun. 7, 2000.

* cited by examiner

*Primary Examiner*—Timothy Thompson
(74) *Attorney, Agent, or Firm*—Foley & Lardner LLP

(57) ABSTRACT

The present invention relates to the use of a camera and a structured light pattern in a platenless document imaging system (1) to capture the image of a page or of a bound book together with depth information that can be inferred from the light pattern. The imaging system (1) comprises a support surface (12) for a document (30) to be imaged, a light stripe projector (4) arranged to project a plurality of diverging sheets of light that extend from the projector (4) towards the support surface (12) for forming a series of stripes across the document (30), a camera (2) having a detector array (22) for capturing an image of the document (30) and of light stripes projected onto the document (30), a processor (25) arranged to receive (23) from the detector array (22) data representative of images of the document (30) and of the light stripes and to calculate therefrom a three-dimensional profile of the document (30) relative to a reference surface, characterised in that the relative divergence of adjacent sheets of light varies laterally across the sheets so that the stripes are concentrated where the divergence is relatively low.

10 Claims, 10 Drawing Sheets

DOCUMENT IMAGING SYSTEM

The present invention relates to the use of a camera and a structured light pattern in a platenless document imaging system to capture the image of a page or of a bound book together with depth information that can be inferred from the light pattern.

Images captured of a curled surface will in general exhibit distortions caused by image perspective, skew and compression or elongation caused by an uneven or a curled surface. Several means, including standard triangulation techniques can be used to calculate the surface profile from captured images of the surface. For example, a camera can be used with a structured light pattern in a platenless document imaging system to capture the image of a page or of a bound book together with depth information that can be inferred from the light pattern.

Desktop flat bed scanners are very common in office imaging applications. Although these are relatively inexpensive and work well, a disadvantage is that these invariably take up a significant amount of desk space, which is always at a premium.

Digital camera products are becoming common in many areas of still and motion photography, and as a result are becoming ever less expensive. However such cameras are still used almost exclusively for photography of people or places, and have yet to be adapted for use in office imaging applications. One reason for this is that a document such as a piece of paper or an open book lying face up on a supporting surface is generally not flat, because the document is not held against a transparent platen as in a flatbed scanner.

It may also be inconvenient for the camera to be mounted above the support surface and look directly downwards to image the document. In order to avoid a structure overhanging a work surface of a desk, it is better if the camera is mounted at an edge of the work surface. This however, results in perspective distortion.

Documents may also not lie at a consistent angle to the camera. In the case of the book, the spine will then be skewed at a variable angle to the optical axis of the camera lens.

Therefore, camera-based capture of a document poses the problem of distortion of the captured image due to image perspective, skew and compression or elongation introduced by the uneven surface and page curl of the sheet or bound book.

Page curl is one of the biggest problems encountered when capturing a document with a camera. The curled part of the document renders poorly on screen and printers, and presents shadows. It is also hard to do stitching and optical character recognition with such a "warped" image.

Recovering or "de-warping" page curl is a difficult problem to solve in general. Methods that are known include inferring shapes from shading, from texture, from overall contours of lines of text. These methods have so far proved to be fragile and often require a significant amount of computer processing power.

One approach to solve this problem is to use structured light to obtain depth information, such as the distance of the page from a plane at right angles to the optical axis of the camera. Such an approach is disclosed in patent document U.S. Pat. No. 5,760,925, in which a document is supported on an underlying support surface with a camera mounted on above and to one side of the support surface, and a light stripe projector mounted on an opposite side of the support surface. The light stripe projector projects a pair of light stripes onto the document. The light stripes are parallel for portions of the document the same height above a reference surface, which is taken to be the support surface. The document is oriented so that most of the curl is in the same direction as the light stripes, but because the document may not be flat in a transverse direction, the shape of the document is interpolated linearly between the light stripes.

This system can in principle capture an image of the document and correct this for page curl only when there is no curl transverse to the light stripes. Although more parallel light stripes can in principle and at increased cost be added to gain additional curl information in the transverse direction, in practice this places a heavy burden on the available processing power and time available to capture and correct for document curl in a product that is commercially attractive in terms of cost and speed.

It is an object of the present invention to address these issues.

Accordingly, the invention provides an imaging system for imaging a document, comprising a support surface for a document to be imaged, a light stripe projector arranged to project a plurality of diverging sheets of light that extend from the projector towards the support surface for forming a series of stripes across the document, a camera having a detector array for capturing an image of the document and of light stripes projected onto the document, a processor arranged to receive from the detector array data representative of images of the document and of the light stripes and to calculate therefrom a three-dimensional profile of the document relative to a reference surface, characterised in that the relative divergence of adjacent sheets varies laterally across the sheets so that the stripes are concentrated where the divergence is relatively low.

The document imaging system can then be arranged so the light stripes are more concentrated where document curl, or the rate of change of document curl, is greatest. It is therefore not necessary for all of the sheets of light to be planar. For example, at least one of the sheets of light may extend in a non-planar sheet with a variable divergence from an adjacent sheet.

In a preferred embodiment of the invention, there is a planar sheet with diverging sheets either side of the planar sheet. The planar sheet may be along a centre plane of the sheets projected from the light stripe projector. Then, the diverging sheets may bow towards the planar sheet so that the light stripes are concentrated in a middle portion of a structured light pattern on the document.

Also according to the invention, there is provided a method of imaging a document using a document imaging system comprising a support surface, a light stripe projector, a camera having a detector array, a processor, in which the method comprises the steps of:

i) placing the document on the support surface;

ii) using the light stripe projector to project a plurality of diverging sheets of light that extend from the projector towards the document;

iii) arranging the light stripe projector so -that the sheets of light fall on the document to produce a series of light stripes on the document;

iv) using the camera to capture with the detector array an image of the document and of light stripes projected onto the document;

v) sending from the detector array to the processor data representative of the captured image of the document and of the light stripes; and vi) using the processor to calculate therefrom a three-dimensional profile of the document relative to a reference surface;

characterised in that the light stripe projector projects adjacent sheets with a relative divergence that varies laterally across the sheets of light so that the stripes are concentrated on the document where the divergence is relatively low.

The light stripes may be formed from visible or invisible optical radiation, particularly near-infrared radiation, and may be generated any suitable source, for example a light emitting diode or a laser diode.

The invention will now be described in further detail by way of example only, and with reference to the accompanying drawings, in which.

Figure 1:
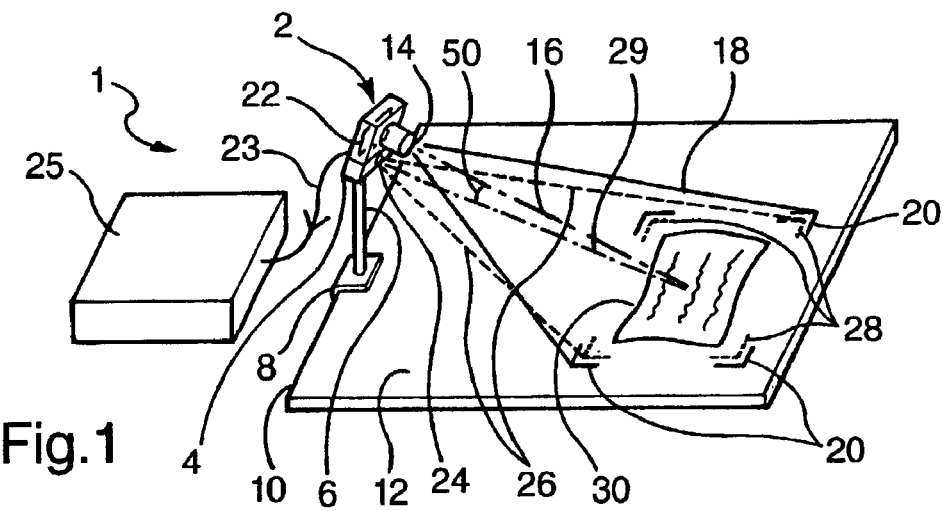
FIG. 1 is a schematic view in perspective of a document imaging system according to the invention, with a camera having a detector array mounted together with a light stripe projector on a post overlooking a document to be imaged.

FIG. 1 shows a document imaging system 1 that has an electronic camera 2 a lower portion of which houses a light stripe projector 4 manufactured by Lasiris, Inc. of St. Laurent, Quebec, Canada, as model number 515L. The camera 2 is mounted atop a support 6 that is clamped 8 to and rises above an edge 10 of a work surface 12. The camera 2 has a main lens 14 with an optical axis 16 that is directed across and down upon the work surface 12. The lens 14 has a field of view 18 that images an area 20 of the work surface 12 onto a two-dimensional CCD detector array 22 within the camera 2.

The detector array is connected 23 to a processor unit 25, which may, for example, be a personal computer with an expansion card for controlling-the camera 2, light stripe projector 4, and for receiving and processing data received from the detector array 22.

Ideally, the area 20 is at least of A4 document size. Similarly, the light stripe projector 4 has a projecting lens 24 that projects a structured light pattern 26 onto a work surface area 28 that is roughly coincident with the imaged area 20. The structured light pattern will be described in more detail below, but extends around a central axis 29 that is roughly coincident on the work surface 12 with the camera lens axis 16. The spread of the structured light pattern is sufficient to cover an A4-size area at about 300 mm distance.

A document 30 has been placed within the area 20,28 defined by the camera lens 14 and structured light pattern 26. The document is supported by the work surface 12 in a generally horizontal orientation, but is slightly curled. An image captured by the detector array 22 will therefore have perspective foreshortening owing to the oblique angle between the camera optical axis 16 and the document 30, and well as warp distortion due to the document curl.

Figure 2:
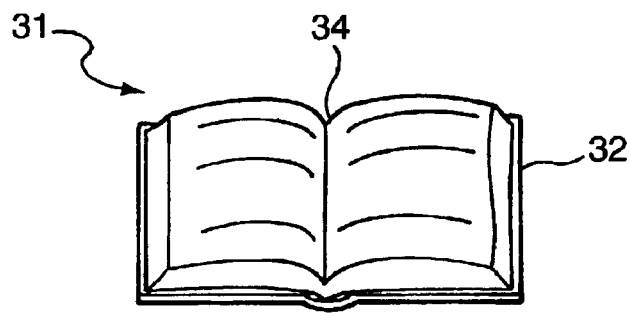
FIG. 2 is a view of an open book as imaged by the camera.

Such warp distortion can be seen in FIG. 2, which illustrates an image 31 of an open book 32 as formed on the detector array 22 by the camera 2. The amount of warp distortion is greatest near the spine 34.

Figure 3:
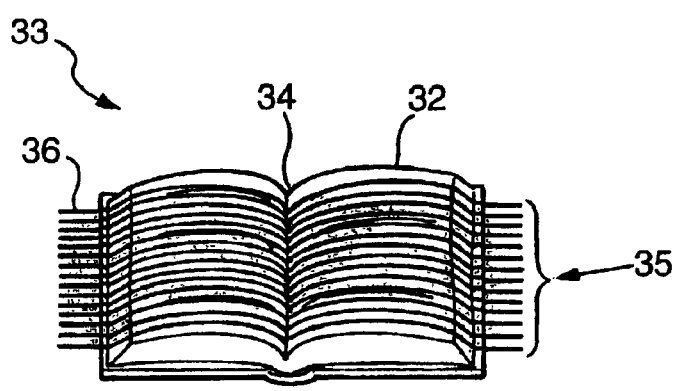
FIG. 3 is a view of the open book with a light stripe pattern projected onto the book.

FIG. 3 shows an image 33 of the open book 32 when the structured light pattern 26 is projected towards the book 32 to produce fifteen separated light stripes 35 over the book 32. The book is oriented so that the light stripes 35 are transverse to the spine 34.

A difference can then be taken between the image 33 with the light stripe pattern 35 and the same image 31 without the light stripe pattern 35, in order to detect the light stripes.

As can be appreciated from FIGS. 1 and 3, the advantage of having the light stripe projector mounted together with and below the camera is that the furthest stripe 36 will always be in view of the camera, even if the stripe is projected beyond the further edge of a book.

Figure 4:
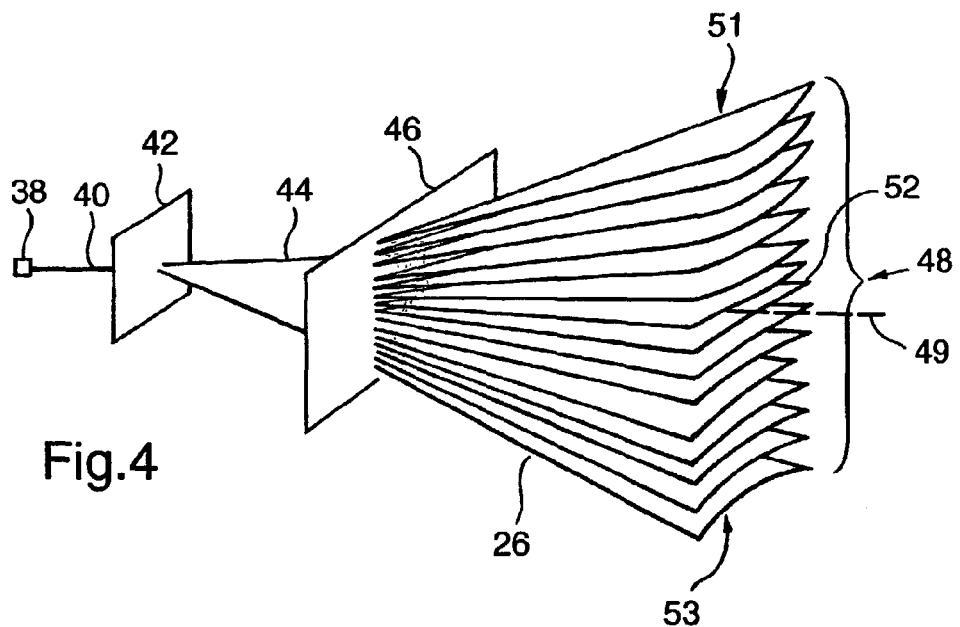
FIG. 4 is a schematic view in perspective showing a structured light pattern produced by the light stripe projector showing diverging sheets of light that bow concavely inwards toward a central planar light sheet.

FIG. 4 shows how the structured light pattern 26 is produced. A fixed 7 mW laser 38 projects a beam of light 40 to a first optical diffractive element 42 that diffracts the beam 40 into a vertically oriented strip 44. The vertical stripe 44 is then diffracted by a second optical diffractive element 46 into the structured light pattern 26 consisting of fifteen diverging, separate and non-intersecting sheets of light 48.

The structured light pattern 26 is projected onto the document 30 with the projection axis 29 offset at an angle 50 to permit triangulation of the light stripes 35 to characterise document curl.

These diffractive elements 42,44 produce a set of seven conical light sheets 51,53 either side of a central planar light sheet 52. The central planar light sheet 52 contains a median ray 49, which also lies on the light stripe projector axis 29.

Each set of light sheets 51,53 bows concavely inwards towards the central planar light sheet 52, with the result that the divergence between adjacent light sheets is a minimum at the middle of the light sheets 48. The sheets are symmetric about a plane that is transverse to the planar sheet and which comprises a median ray of the planar sheet 52.

Figure 5:
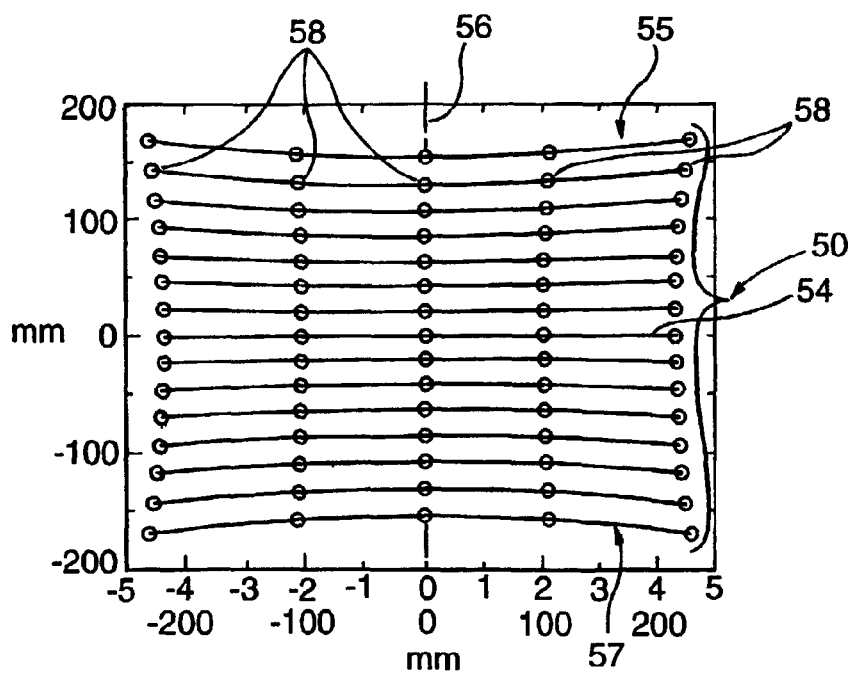
FIG. 5 is a plot of light stripes formed by an intersection of the structured light pattern of FIG. 3 with a plane transverse to the sheets.

As shown in FIG. 5, the conic light sheets 51,53 will in general generate curved, non-parallel light stripes on the document, with a concentration of light stripes along a line centrally transverse to the light stripes 35. The concentration of stripes corresponds with the minimum divergence between adjacent light sheets. In FIG. 3, this concentration is about the book spine 34. In this example, the concentration of light stripes about the spine 34 will provide enhanced curl information in the region of greatest document curl.

Triangulation of conic light sheets is, however, a non-trivial problem. For this reason a closed-form solution to this triangulation problem is described below that can be applied in general with this kind of structured light to characterise document curl. The closed form of the triangulation also allows the use of a standard optimisation method to perform an initial calibration of the camera 2 and light stripe projector 4 system.

Although the use of a multiple line structured light pattern has advantages in terms of cost, the time needed to capture an image, and mechanical complexity over traditional laser scanning methods in the sense that there are no moving parts such as galvanometers or stepper motors, there is a drawback in that the three-dimensional resolution is less, being limited to the number of lines in one direction. This drawback is partly mitigated by the concentration of lines in the region of greatest curl and, as will be explained below, by the use of novel methods to characterise and de-warp image curl.

Triangulation works as follows. First, light stripes 48 are projected onto an object which is viewed by and projected onto the camera image plane at the detector array 22. Let us suppose for the moment that the laser projects just a single light sheet of a known shape and defined by a corresponding known equation in the camera reference system, which when cast onto an object and imaged by the camera produces a single curve (or stripe) on the image plane. A given point of the stripe defines a line in space going from the camera optical axis through the image. The intersection between the light sheet and this line defines a three-dimensional point in the camera reference system that is on the surface of the object. By repeating the procedure for each stripe point, we can effectively recover all the object's points that lie on the curve defined by the intersection of the projected light sheet and the object surface.

In this invention we do not have a single light sheet but rather a set of them slightly displaced in order to cover a larger portion of the object, and thus obtain a three-dimensional snapshot of it. In the single light sheet case we knew that any image stripe point corresponded to the projection of a 3D point of a known stripe and this is why it is possible to do triangulation unambiguously. Conversely, in the multiple light sheet case we do not actually know which particular light sheet generated that projection and so some sort of stripe labelling or identification is necessary to determine which image stripe was generated by a particular light sheet.

The camera 2 and light stripe generator 4 system is initially calibrated by measuring a reference surface, which for convenience may be a support surface 12. The vertical displacement between the undistorted projection on the reference surface and the distorted projection on the curled document is a unique function of depth or height of the curled document relative to the reference surface.

The diffractive light stripe projector 4 produces a structured light pattern that with stripes 48 each of which that has a periodic intensity variation along its length. To a first approximation, the peaks in light intensity of the structured light pattern therefore occur at points, which on a spherical surface centered on the light stripe projector can be represented by the following equations:

$$x_{i,j} = i\lambda \frac{D}{\Lambda_1 N_{i,j}} \text{ and } y_{i,j} = j\lambda \frac{D}{\Lambda_2 N_{i,j}} \text{ where} \quad (1)$$

$$N_{i,j} = \left[1 - \left(i\frac{\lambda}{\Lambda_1}\right)^2 - \left(j\frac{\lambda}{\Lambda_2}\right)^2\right]$$

and where (x,y) (0,0) is on the projection axis 29, D is the distance from the light stripe projector 4, $\lambda$ is the laser wavelength, $\Lambda_1$ is the period of the grating for diffractive element 42 and $\Lambda_2$ is the period of the grating for diffractive element 46.

FIG. 5 shows fifteen light stripes formed by the intersection of a plane spaced 0.5 m from the light stripe projector and at right angles to the light sheet projection axis 29. The central planar light sheet 52 produces a straight light stripe 54, and light stripes 55,57 on either side of the central light stripe 54 bend inwards towards the central light stripe 54. The light stripes are therefore concentrated along a central line 56 transverse to the central stripe 54.

Figure 6:
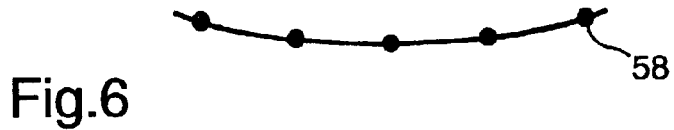
FIG. 6 is a plot of a polynomial fitted through five points taken from one of the light stripes of FIG. 5.
Figure 7:
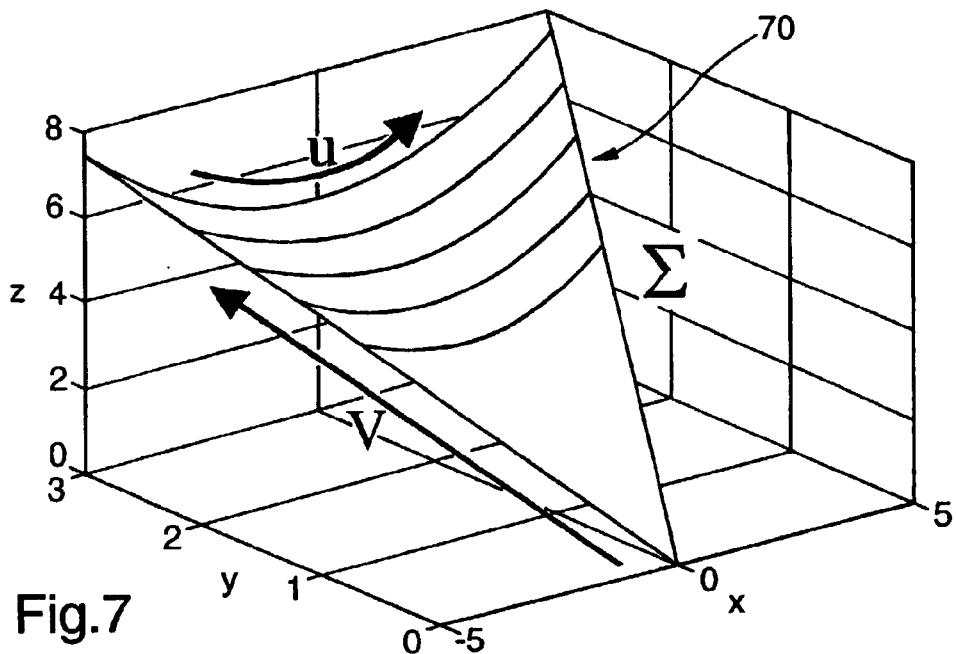
FIG. 7 is a plot of a parametric light sheet cone constructed from polynomials such as those of FIG. 6.

In order to perform triangulation in closed-form on the projected light stripe pattern, it is necessary to express this pattern and hence each light sheet 48 in a mathematical form. Therefore, five points 58 which correspond to subsidiary maxima along each light stripe 50 are used, as shown in FIG. 6, to generate a second-order polynomial $\Gamma$ of the projected stripe on the orthogonal plane at a given distance. Although the stripe is, strictly speaking, not quadratic, we have noticed that the deviation from the data is less than 0.01% when the polynomial is of second order. The equation of the polynomial $\Gamma$ can be expressed in parametric form as:

$$\Gamma_N : \begin{cases} x_{\Gamma,N} = u \\ y_{\Gamma,N} = b_N + a_N u^2 \\ z_{\Gamma,N} = c_N \end{cases}$$

where the index N stands for the stripe number and u is a free parameter illustrated graphically in FIG. 7. From this we can construct a cone 70 centered on the projection axis 29, by letting v be a parameter sweeping the cone length. The cone 70 is expressed as:

$$\Sigma_N : \begin{cases} x_{\Sigma,N} = vx_{\Gamma,N} = vu \\ y_{\Sigma,N} = vy_{\Gamma,N} = v(b_N + a_N u^2) \\ x_{\Sigma,N} = vz_{\Gamma,N} = vc_N \end{cases} \quad (2)$$

As explained below, of particular interest is the algebraic form of each cone of light, which is obtained by elimination:

$$\Sigma_N : yz - z^2 \frac{b_N}{c_N} - a_N c_N x^2 = 0$$

In order to perform triangulation in closed-form, it is necessary also to know the relative orientation of the camera lens axis 16 and the light stripe projector axis 29, referred to herein as the roto-translation $R_{OL}$ between the camera 2 and the light stripe projector 4

The intrinsic camera model employed in this invention is described by a conventional set of five parameters, which are the focal length f, the number of pixels per meter in the horizontal and vertical direction $\alpha_x$ and $\alpha_y$, the "piercing point" ($x_o$ $y_o$) (assumed to be at the image centre) plus the radial distortion parameter K.

The calibration of the camera parameters f, $\alpha_x$ and $\alpha_y$, the "piercing point" ($x_o$ $y_o$) can be estimated with a method described by Tsai, R. Y., IEEE Transactions on Robotics and Automation, No. 4 pp. 323–344, 1987.

Figure 8:
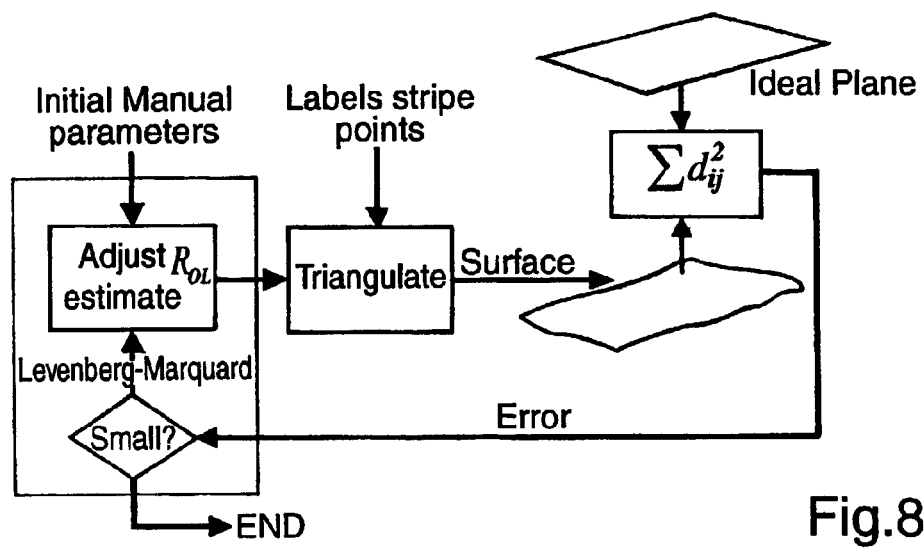
FIG. 8 is a flow chart depicting a calibration process for the roto-translation between the camera and the light stripe projector.

The estimation of the roto-translation $R_{OL}$ is accomplished by a custom method based on an optimization process starting with the capture of sparse three-dimensional data of a planar object. An initial rough estimate of $R_{OL}$ is then determined. Following this, an iterative process shown in FIG. 8 is used to adjust six parameters representative of $R_{OL}$ (three Euler rotations angles and three translations) until triangulated data points become effectively planar. Minimization of errors is carried out by an implementation of the Levenberg-Marquard method.

Figure 9A:
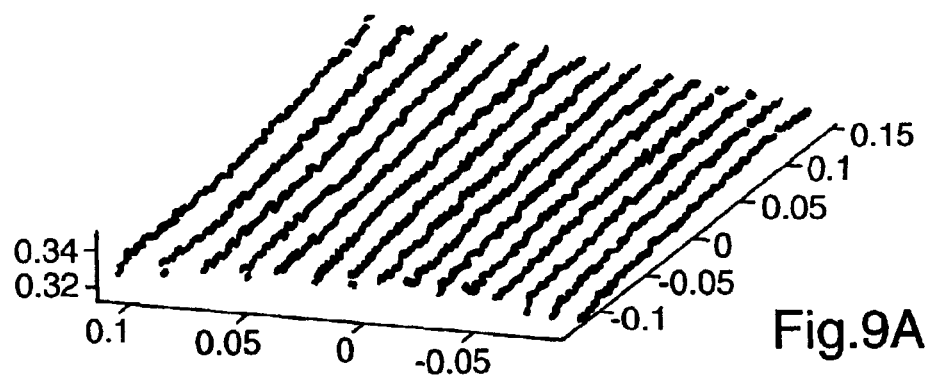
FIGS. 9A and 9B show the error in detection of the profile of a planar surface using the document imaging system when an initial estimate of the roto-translation is used.
Figure 9B:
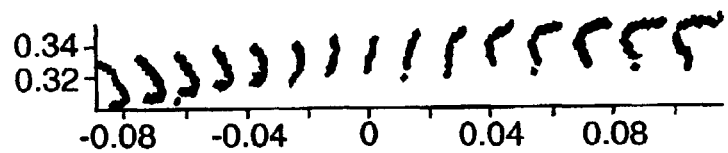
Figure 10A:
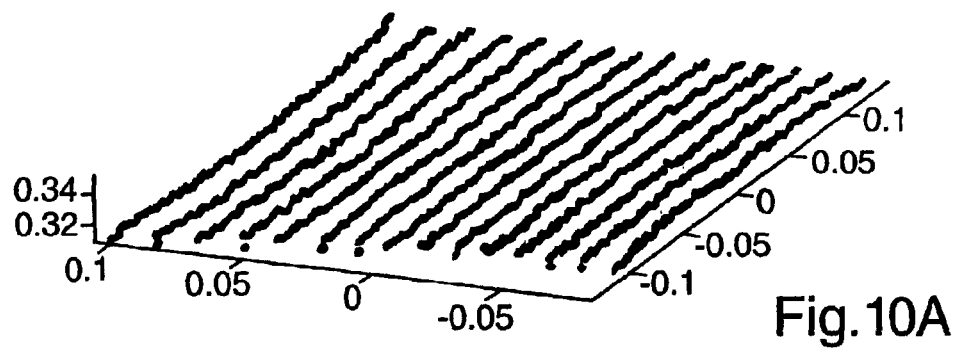
FIGS. 10A and 10B show the error in detection of the profile of a planar surface after calibration of the roto-translation according to the flow chart of FIG. 8.
Figure 10B:
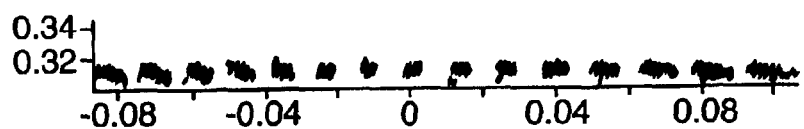

FIGS. 9A and 9B show two graphs that illustrate the errors in measuring a planar surface using the initial rough estimate of $R_{OL}$ FIGS. 10A and 10B show two similar graphs using the final estimated $R_{OL}$ after the optimisation process of FIG. 8. These graphs show that the reduction in the standard deviation of the error in the measurement of the plane is reduced from 20 mm to less than 1 mm. The residual error is due to measurement noise.

Correction of radial distortion is generally neglected in the field of document imaging. However, it has been discovered that this correction is important in order to obtain sufficiently accurate results. The mapping from distorted to undistorted co-ordinates is:

$$\begin{cases} \bar{x} = x + xK_1 d^2 \\ \bar{y} = y + yK_1 d^2 \end{cases} \quad d = \sqrt{(x - c_x)^2 + (y - c_y)^2}$$

For simplicity of presentation, these new coordinates will in the following description be treated as the actual image coordinates, although one has to bear in mind that these are corrected coordinates derived from the above mapping.

Figure 11A:
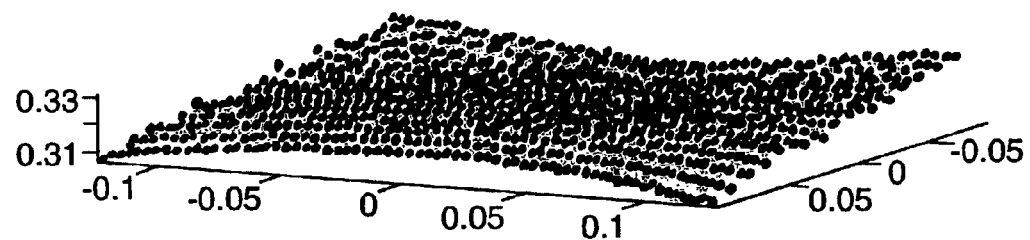
FIGS. 11A and 11B show respectively the errors in the detection of a planar surface without and with radial distortion correction.
Figure 11B:
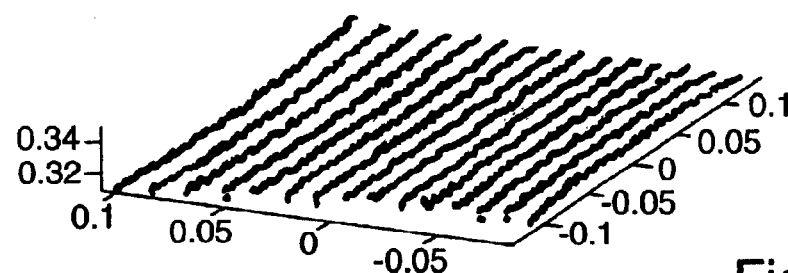

The camera 2 used in the present example has a radial distortion parameter K=0.004 pixels/mm². FIG. 11A shows how, even when the $R_{OL}$ has been calibrated, if the radial distortion is not accounted for the error becomes very large once this distortion is allowed for, the distortion is as shown in FIG. 11B.

Because there is more than one light stripe, it is necessary to identify each light detected stripe before triangulation is performed. There are two distinct parts in this process, the first one being stripe detection and the second one stripe labelling.

The three-dimensional document image capture can be done by briefly flashing the laser pattern and synchronously detecting with the detector array 22 the document image including the light stripe pattern, as shown in FIG. 3. Either before or after this, the document is imaged without the light stripe pattern, as shown in FIG. 2. There will then be two overlapping images, one with the pattern and one without and thus it is straightforward to use image differencing to make the stripes stand out.

Figure 12:
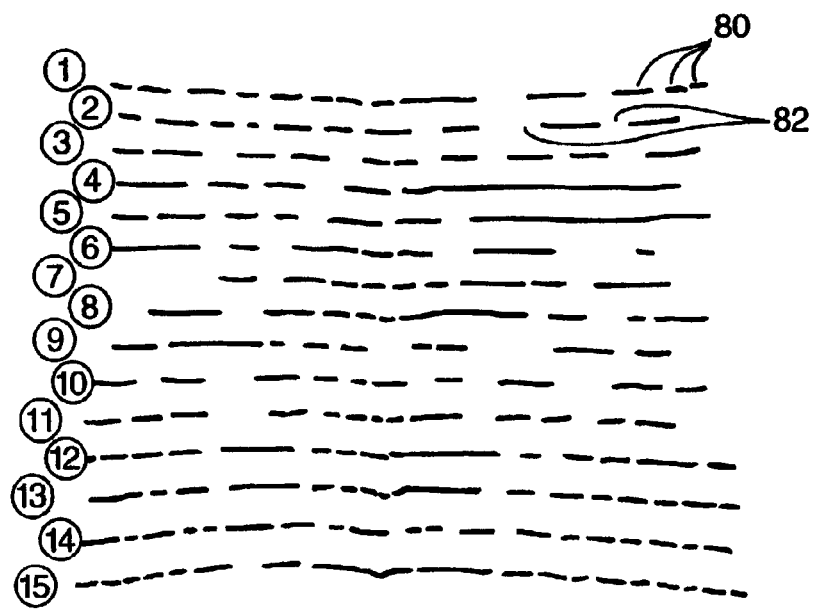
FIG. 12 shows the results of a stripe detection and labelling process.

However, the intensity value across stripes will in general be uneven, for example owing to subsidiary peaks as in equation (1) above, or because of uneven ambient illumination or paper reflectance. Therefore, the image of the lights is processed. Given the prevalently horizontal lines, the first step is to use a one-dimensional Laplacian operator (second derivative) applied only on the y (vertical) direction. The application of this operator gives the centre of the stripe a high negative value. This value can then be thresholded to obtain a binary image. The process is robust and fast but the use of a single threshold may inevitably cause some gaps in the continuity of the detected stripes, as shown in FIG. 12.

The method used to identify light stripes is as follows. First, the stripes are thinned down to one pixel thickness and connected pixels are joined together into a string. Next, strings that are too short are removed from the classification as deemed noise. The result is a data set of pixels as shown in FIG. 12, where string segments 80 are interspersed with gaps 82.

Then for each string, a heuristic "strength" measure is computed as $$S = 0.5 * \text{Length} + 0.5 * \text{Abs}(\text{Avg}(\text{Top 30\% of Laplacian value}))$$

This is an equally weighted sum of the length and the average of the top third of the absolute value of the Laplacian values we do not average all the values of the Laplacian along a string because the stripe intensity is not uniformly distributed and some faint sections might adversely affect the average.

Next, for each column of pixels and starting from the top row of pixels of the image, we assign successive, increasing label numbers to, and only to, the strongest stripe points in the sense above. The numbering of stripes stops at the maximum number expected, here fifteen. Finally, for each string we assign a label equal to the most popular label assigned to all the points of that string. FIG. 12 shows the labelling result in which all stripes are correctly identified.

This approach, which is essentially a voting method, is very robust in general situations and can smoothly cope with gaps. It is also relatively fast to run with inexpensive hardware. It has the advantage that the light stripes are individually indistinguishable, with individual stripes being identified by counting the series of stripes.

There are situations in which the method would fail to label stripes properly, namely when the assumptions onto which it is based are not meet. For instance if a stripe is completely or largely invisible or occluded by, for example, a thick book edge, the label assignment will be meaningless. Therefore, in an alternative embodiment not illustrated in the drawings, the light stripes are made individually distinguishable by spatial modulation.

Having said so, these are situation that should not occur in practice when the light stripe projector is properly arranged with respect to the camera, for example being mounted on the same side of the document as the camera and below the level of the camera.

The proposed approaches to identifying stripes are quick and simple compared with other approaches in which the stripes are temporally modulated or otherwise made individually distinguishable, for example by colour coding.

Figure 13:
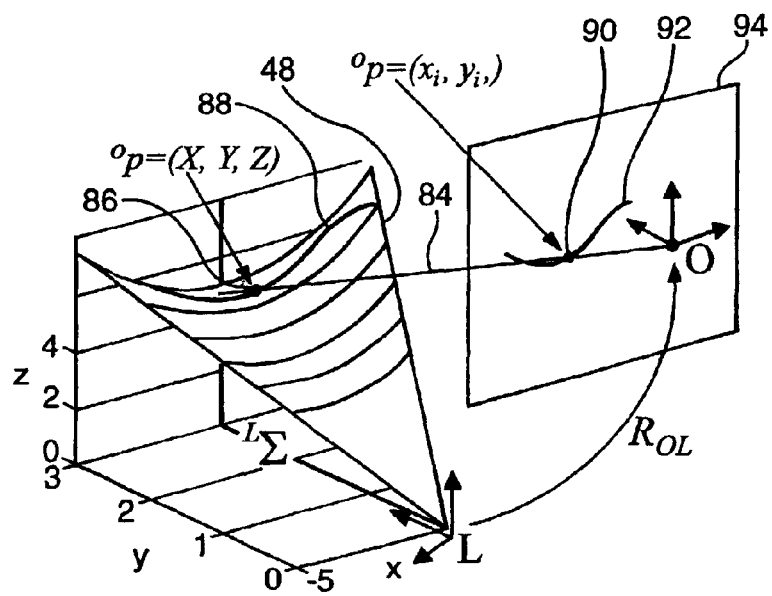
FIG. 13 shows a light sheet and terminology used in a triangulation process to compute the intersection of the light sheet and the light stripe.

Three-dimensional points can then be obtained via triangulation, which as illustrated in FIG. 13 consists of finding the intersection between the sheet of light 48 and an optic ray going 84 through a given point 86 on the projected stripe 88 and a corresponding point 90 on the detected image 92 in the detector plane 94.

Referring to FIG. 13, let $^O P = (X, Y, Z)$ be a three-dimensional point in the camera reference system O, $^O p = (x, y)$ a stripe point in the image plane, $^L \Sigma$ the conical surface representing the conical light sheet 48 in the light stripe projector reference system L, and $R_{OL}$ the transformation between the two reference systems expressed by the four-by-four matrix:

$$R_{OL} = \begin{bmatrix} n_x & o_x & a_x & p_x \\ n_y & o_y & a_y & p_y \\ n_z & o_z & a_z & p_z \\ 0 & 0 & 0 & 1 \end{bmatrix}$$

The triangulation problem is to finding the intersection between a generic elliptic cone and a line in space. First we transform the cone into the reference system of the camera via $R_{OL}$ by expressing a cone point in terms of a point in the O reference system transformed into L:

$$^O\Sigma : \left\{ \left\{ {}^L\Sigma : {}^Ly {}^Lz - {}^Lz^2 \frac{b_N}{c_N} - a_N c_N {}^Lx^2 = 0 \right\} \leftarrow \left\{ \begin{array}{l} {}^Lx = n_x^*x + o_x^*y + a_x^*z + p_x \\ {}^Ly = n_y^*x + o_y^*y + a_y^*z + p_y \\ {}^Lz = n_z^*x + o_z^*y + a_z^*z + p_z \end{array} \right\} \right\}$$

The parametric form of the optic ray is:

- $x = tx_i$
- $y = tx_j$
- $z = tf$ where f is the focal length and the x and y are expressed in image coordinates. Then we write down a system that expresses the intersection between this cone and the optic ray:

$$\begin{cases} {}^O\Sigma : f({}^Ox, {}^Oy, {}^Oz) = 0 \\ {}^Ox = tx_i \\ {}^Oy = ty_i \\ {}^Oz = tf \end{cases}$$

By simple substitution, we arrive at a second order equation in the parameter of the optic ray t:

$$At^2 + Bt + C = 0 \rightarrow [t_1, t_2]$$

whose solutions $t_1$ and $t_2$ represent the two intersections of the ray with the cone. This equation can be solved analytically and the rather knotty solution has been found but is omitted here for clarity.

We are interested in only one of the above-mentioned intersections which turns out to be, because of the way we constructed the cone, the one corresponding to the smallest parameter u spanning on the half cone closer to the Z axis of the reference system L.

Hence, we transform both solutions back to the light stripe projector reference system L:

$$^LP_\lambda = \begin{bmatrix} {}^LX_\lambda/w \\ {}^LY_\lambda/w \\ {}^LZ_\lambda/w \\ 1 \end{bmatrix} = R_{OL}^{-1} \begin{bmatrix} t_\lambda x_i \\ t_\lambda y_i \\ t_\lambda f \\ 1 \end{bmatrix}$$

and use the 2nd of Equations 2 to recover the two corresponding u's, that is:

$$\bar{t} = \left\{ t_\lambda \text{ such that } \lambda = \underset{\lambda}{\operatorname{argmin}} \left( u_\lambda = \frac{{}^LX_\lambda c_N}{{}^LX_\lambda} \right), \lambda = 1, 2 \right\}$$

Finally, the three-dimensional intersection point is given by:

- $X = \bar{t}x_i$
- $Y = \bar{t}x_j$
- $Z = \bar{t}f$

We have now found the coordinates of the point in space that belongs to the intersection of the light sheet with the object and whose projection is a particular stripe pixel in the image.

This process has to be repeated for each pixel (and optionally at sub-pixel resolution) of each of the fifteen stripes. The triangulation process is very fast but if necessary it would be possible to sub-sample along each line. The result is a "cloud" of three-dimensional points such as that shown in FIG. 14.

Now we have a cloud of three-dimensional data points 95 representing the paper surface. The problem is how to use these points 95 to undo or "de-warp" the curl distortion.

It is in general difficult to de-warp an image of a curled document. The main problem is that paper is not a generic surface, but a developable surface, that is one that can be unfolded without tearing or stretching onto a plane. The Gaussian curvature K of a developable surface S(u,v) is zero everywhere, i.e. K(u,v)=0.

The conventional surface reconstruction approach of fitting and regularizing a surface, possibly with some discontinuities, does not apply to our problem since we not only need to reconstruct, but we also have to unfold this surface onto a plane. This is not possible if the reconstructed surface is not developable in the first place. Hence, it is necessary to constrain the fitted surface to be developable, that is, with zero Gaussian curvature everywhere, which is a not trivial operation.

Figure 14:
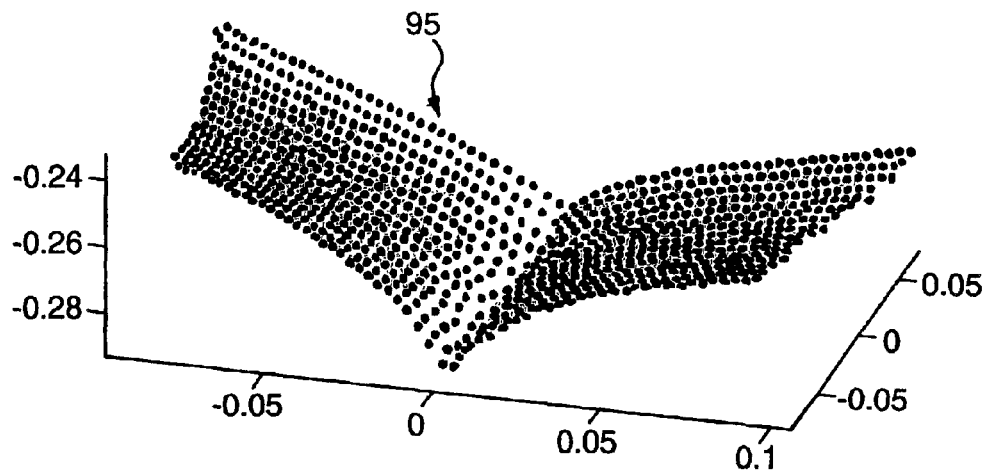
FIG. 14 shows a set of measured data points of an open book generated with the document scanning system.
Figure 15:
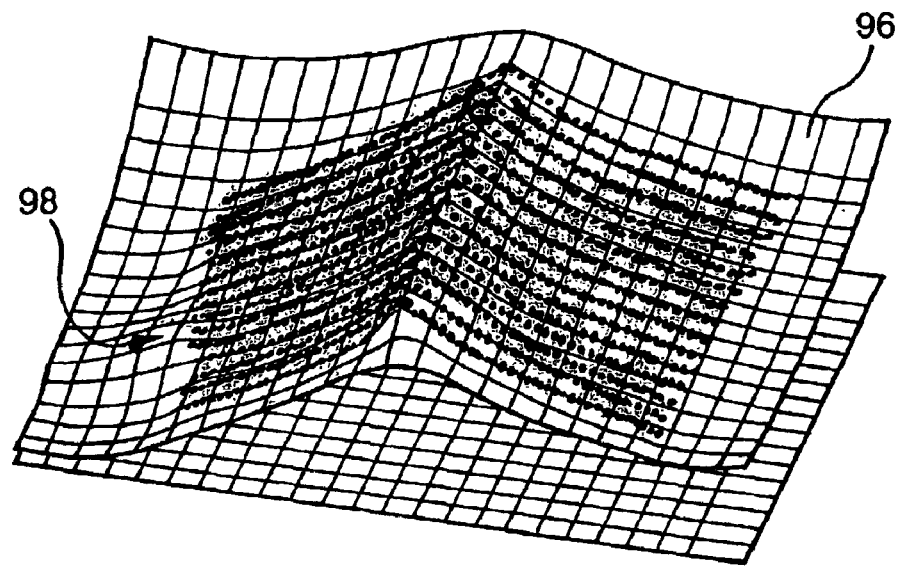
FIG. 15 shows the profile of a surface fitted with a bicubic spline to the measured data points according to a prior art method of dewarp curl.
Figure 16:
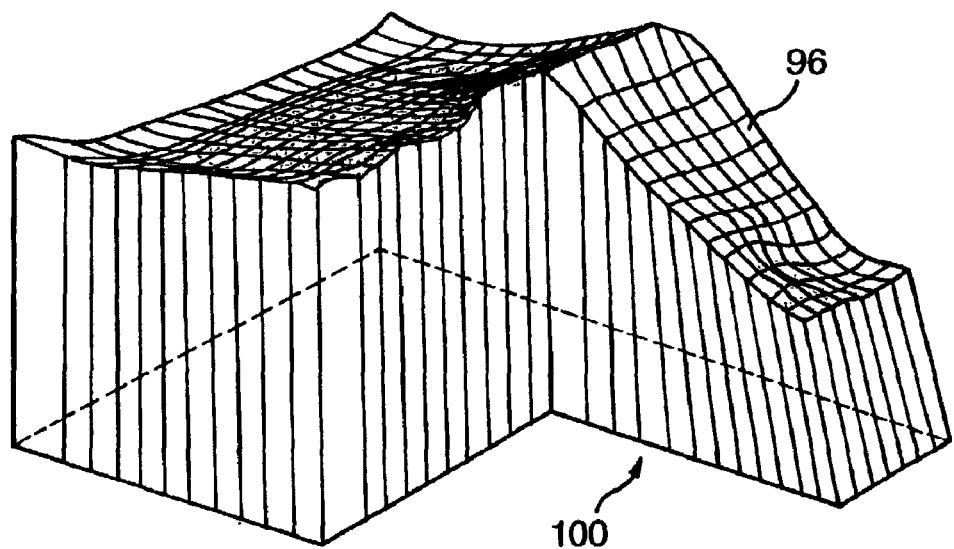
FIG. 16 show the prior art results of unrolling the bicubic spline onto a plane.

FIGS. 15 and 16 illustrate why a simple approach will in general not work. The three-dimensional data of FIG. 14 has been smoothed and a bi-cubic spline surface 96 has been fitted. In the ideal case where data is noiseless and the light stripe projector and camera system is perfectly calibrated, a fitted surface should also be developable, but in reality the surface we obtain is clearly not so. For example, see the little bumps in some places 98.

If we now uncurl the page, we have to texture-map patches from the original image onto patches of a plane, a mapping computed by integration of finite differences in the meshed surface 96 as shown in FIG. 16.

However, by definition, a non-developable surface can only be unrolled onto a plane by either tearing or stretching which causes unnatural distortions in the unrolled document 100. This is due to the integrative nature of unrolling a surface where locally small errors tend to build up and lead to unsightly distortions. FIG. 16 shows the distortion in the texture, which his caused by the irregularities in the farther side of the reconstructed planar mesh in FIG. 15.

So the problem of unrolling the page can be restated as a problem of fitting a developable surface onto noisy data.

A second problem is that the light stripes do not cover the entire page or there might be gaps right near the edges of the page/book. In this case we do not have three-dimensional data so we would not know how to unroll these regions.

Briefly, the method used with the present invention uses a finite element model represented as a triangular mesh that simultaneously fits to the data and constrains the data to be isometric with a plane (i.e. developable) by a relaxation process.

Figure 17:
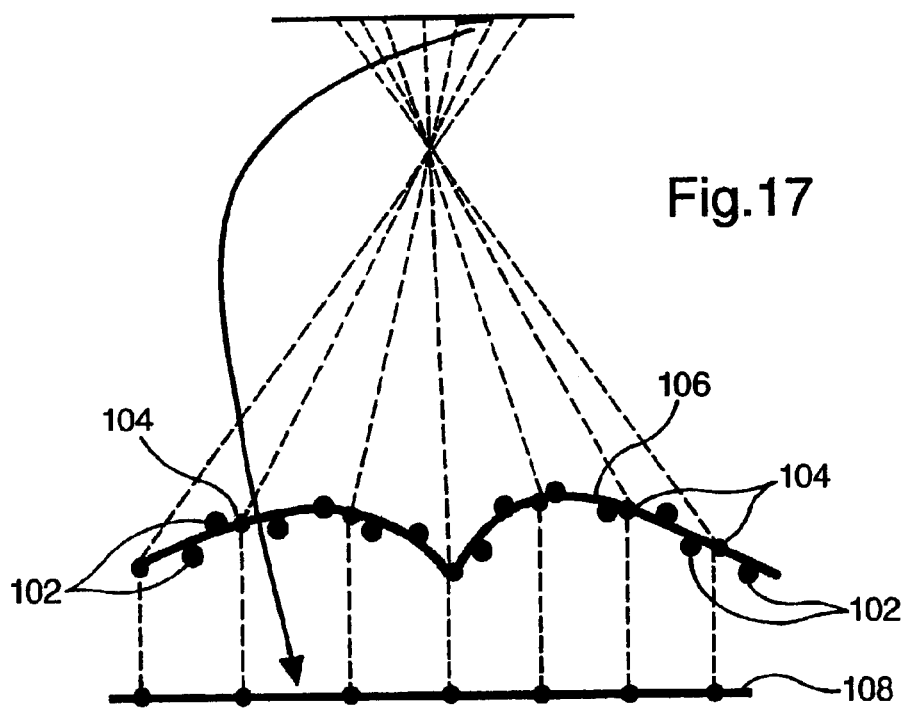
FIG. 17 is a schematic diagram of a prior art orthoimage method to dewarp curl when applied to the fitted surface.

First consider the problem in two-dimensions as illustrated in FIG. 17. Here there is a set of data points 102, referred to herein as a "first set of points", representing noisy measurements of a curve along its length. Another set of points 104, referred to herein as a "second set of points", can then be fit with a least squares fit to the first set 102. A connected piecewise linear curve 106 can be constructed going through the second set of points 104. The second set of points 104 can always be "undone" to a line 108, as the linear curve is isometric to a line. This property explains why many one-dimensional model of the curl and produce good results when the document curl is essentially cylindrical. However, in a general three-dimensional case it is not possible simply to unfold a two-dimensional set of points representing a curled document owing to noise or other inaccuracies in the points.

There is a old technique used in cartography called orthoimage projection. The method essentially does not correct for page curl but simply projects the texture orthographically onto a plane. This method, albeit simple and not prone to local distortions, is fundamentally flawed, because it does not unfold the document but rather just "pushes it down".

Sheet-like documents and paper cannot deform arbitrarily. Instead, these deform in such a way that arc-length between arbitrary points on the surface are preserved. This amounts to saying that the surface deforms isometrically and can be mathematically represented by a developable surface. The invention makes use of such surfaces as a generic model for document deformation in which sparse but distributed 3D data has fitted to it a developable surface, which is then appropriately unrolled, i.e. texture mapped, to produce a rectified image of the document. By employing a physically and self-consistent model of paper, the elimination of distortion in the curl correction is also ensured.

A surface is called a developable surface when its Gaussian curvature vanishes at every point. Developable surfaces can be flattened onto a plane without stretching or tearing. Similarly, a developable surface is one that is obtained by bending a plane, where with bending we mean a transformation that preserves arc length.

Note that not all ruled surfaces are developable. Developable surfaces are a special subclass of ruled surfaces, that is surfaces that are generated by a straight line moving in space.

The analytic form of a developable surface is a parametric equation of a ruled surface with the constraint of the tangent plane being the same along each ruling. This definition is per se impractical and is mainly suitable for interactive modelling or display.

Figure 18:
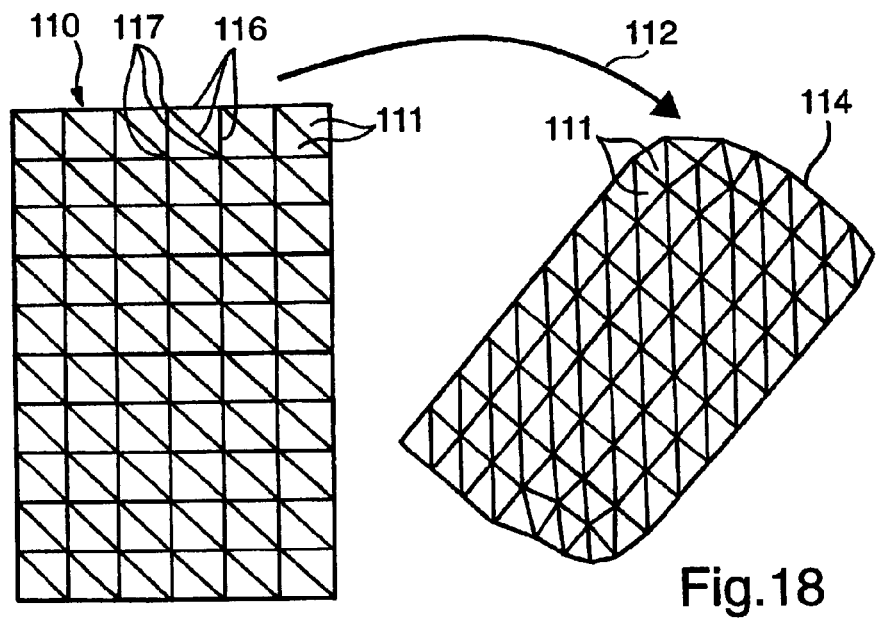
FIG. 18 is a schematic diagram of a triangular mesh used to approximate a developable surface.

A Finite Element Model (FEM) can be used to represent a developable surface, for example a mesh 110 such as that shown in FIG. 18 having triangular tiles 111. Such a mesh can be deformed 112 to approximate 114 a developable surface. When the mesh 110 is deformed, the tiles 111 remain unchanged.

A developable surface can be modelled with a triangular mesh by assuming that the lengths of mesh edges 116 between mesh nodes 117 keeps constant as the mesh is deformed. Of course, making the mesh finer can make any approximation error arbitrarily small. It has to be noted, however, that it is in general not possible to split triangles and refine the mesh locally to reduce the error in, say, regions of high curvature once the mesh has started deforming.

Creases too can be modelled with such a deformable wire-frame mesh. In fact, by increasing the resolution of the mesh it is possible to model more and more accurately any developable surface, and thus any arbitrarily deformed piece of paper.

Figure 19:
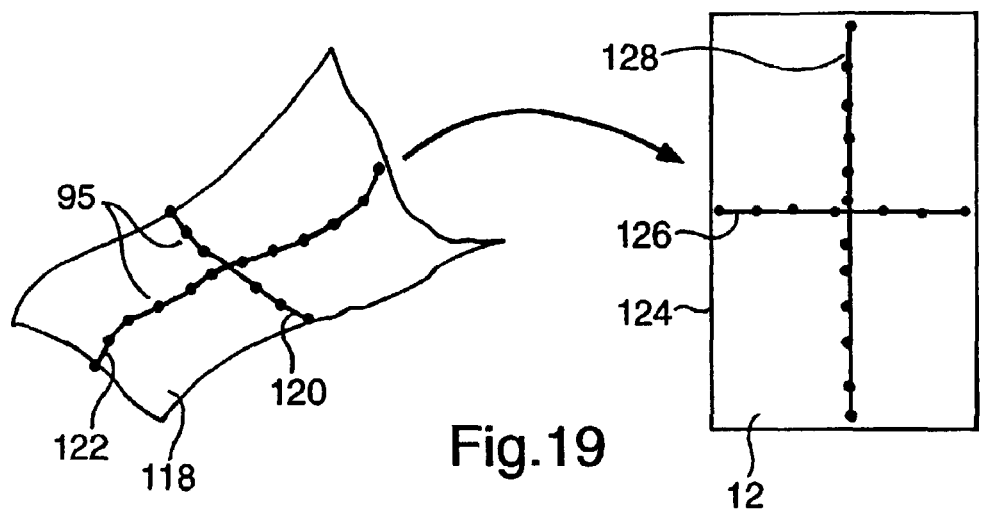
FIG. 19 is a schematic diagram of a way of estimating from the measured data points the approximate extent when dewarped of a curled document.

The document curl characterisation process described above will in general produce noisy, sparse data as shown in FIG. 14. The extent of the surface may not be known. FIG. 19 shows one way to estimate the extent of the surface. A convex hull or rectangle 118 (or equivalently a square) enclosing all the "first set of points" 95 is projected onto the support plane 12. A rectangle 124 can then be deduced from extreme points of the projected lines 126,128. In FIG. 19, a B-spline fits the data points 95 and estimates its extent by integration along some chosen curves 120,122.

Alternatively, the document scanning system may permit a user to select the size of the document. Alternatively, the extent could be determined straight away from the image only using the known system geometry, that is, stand position with respect to camera 2 and camera calibration parameters.

This latter approach would also help overcome problems of mismatch that could occur is part of the three-dimensional data 95 does not belong to the same developable surface. This might be the case if the data is of a thick book or a small curled document and the structured light pattern is bigger than the document region. In this case there needs to be a way to tell what belongs to the document and what is does not. This could be done by analyzing a generic surface fitted to the data with a search for steep curvature or depth changes. Points outside such sudden changes could then be discarded. Another way would be to allow for the mesh to break during the "relaxation" process described below wherever the process does not converge.

Figure 20A:
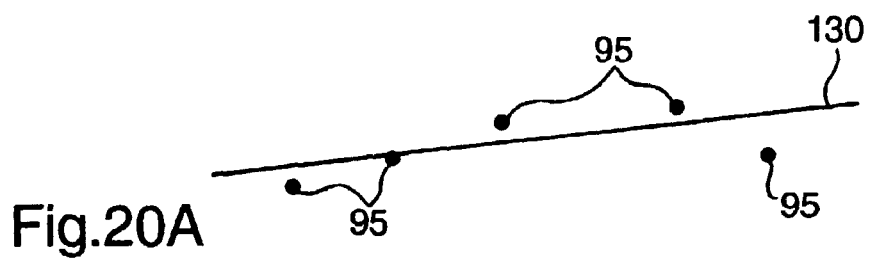
FIGS. 20A, 20B and 20C show in a two-dimensional analogy how the mesh is initially fit to the measured points in a process which stretches the mesh so that it is no longer developable.
Figure 20B:
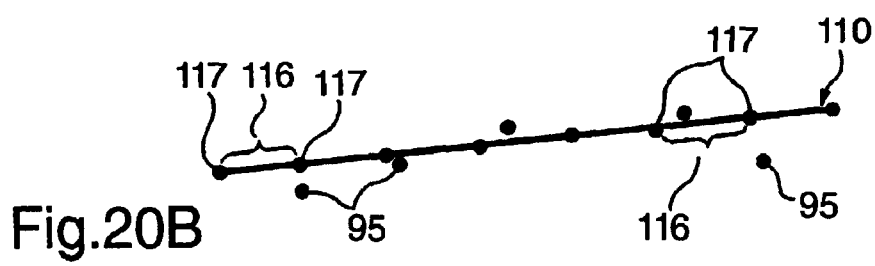
Figure 20C:
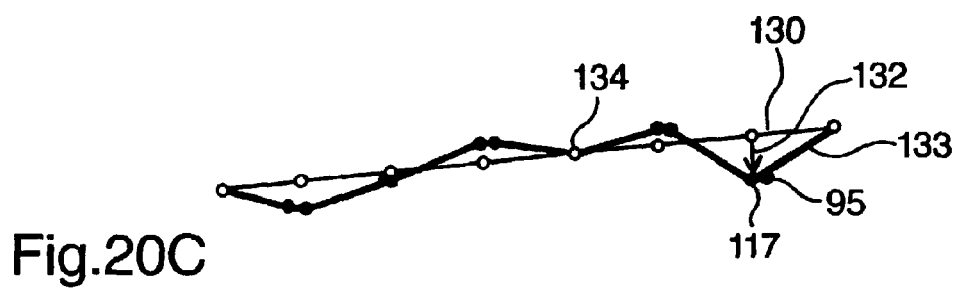

Once the extent of the surface 118 and the corresponding planar projection 124 are known, the mesh 110 is fit to the noisy set of points 95. The process can be understood with reference to FIGS. 20A, 20B and 20C, which show for clarity an "initialization" process in a two-dimensional analogy.

First an "initial" surface, here a plane 130, is fit with a least squares deviation through the noisy three-dimensional set of points 95. Then the planar mesh 110 is rotated and translated so as to coincide with this plane 130 and the estimated extent 124 of the surface 118. Then each mesh node 117 is vertically translated 132 at right angles to the least squares fit plane 130 towards the closest point 95. If there is no point 95 within a certain radius, here taken to be one-third the distance to the nearest neighbouring node 117, then the node is left in place, as is the case in FIG. 20C for one node 134. The result is a distorted mesh 133 represented by a "second set of points" 117, which in this example consists of the mesh nodes.

At this stage, the mesh 133 is no longer developable, that is the isometry with the plane 130 we started with is lost. However, albeit coarsely, the mesh does now approximate the surface 118. The next stage is to adjust the mesh 133 so that it is again developable, and this is done in a "relaxation" process.

Let us first define the terminology to be used. Let $x_i = [x_i, y_i, z_i]^T$ be a mesh node defined as a vector of corrdinates in a Cartesian system, and let $X = \{X_1, \ldots X_N\}$ be the set of nodes of the mesh. Also let $e_{ij}$ be an edge of the mesh joining two nodes $x_i$ and $x_j$ and let $E = \{e_{hh}, \ldots e_{iMjM}\}$ be the set of all the edges of the mesh. The mesh can then be represented by $M = (X, E)$. Let us also define a neighbourhood of a node $X_1$ as the set of nodes $N_1 = \{x_j : e_y \in E\}$.

We shall indicate with $d_{ij} = \sqrt{e}, \text{rad } (x_i - x_j)^T (x_i - x_j)$ the Euclidean distance between two nodes and with $\bar{d}_{ij}$ the reference distance that the mesh had in its original flat state.

Figure 21:
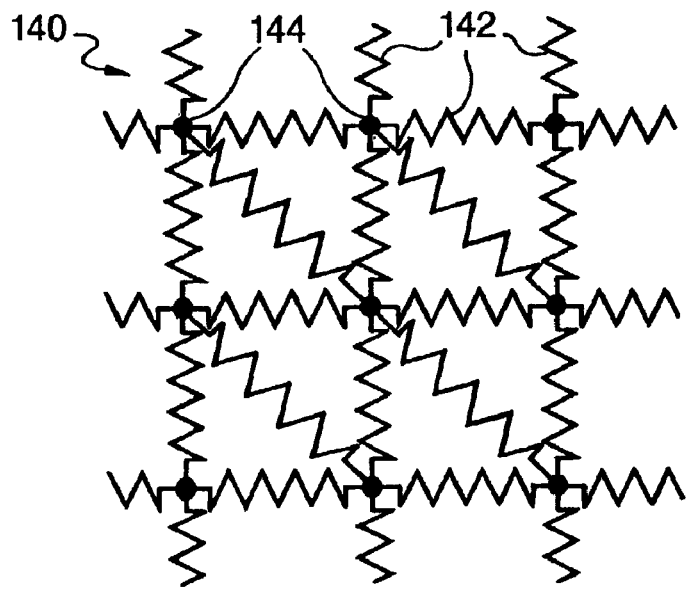
FIG. 21 is a schematic diagram showing by analogy with a spring mesh how the mesh is relaxed back to a developable state in which it is optimally fit to the measured points.

In order to transform the mesh to a developable state while still approximating the data, an optimization method is used to minimize the deviation of the mesh from the ideal developable state. FIG. 21 illustrates by way of a mechanical analogy a mesh 140 of springs 142. In a relaxed state, the mesh 140 has relaxed springs 142 of extension $\hat{d}_{ij}$ connected to each other at nodes 144. This reticular structure 140 will therefore be at a minimum energy in a stable state when all the springs have extension $\hat{d}_{ij}$ and when this happens the mesh 140 is isometric with the plane.

Hence, the problem is equivalent to that of minimizing the total elastic energy of the system:

$$U = \frac{1}{2} K \sum_{i=1 \ldots N} \sum_{j \in N_i} [\hat{d}_{ij} - d_{ij}]^2$$

This is done using the well-known gradient descent method that iteratively adjusts the position of the nodes until the final, lowest energy is reached. Note that the elastic constant K can be ignored during the minimization process.

Node co-ordinates are updated according to the following rule:

$$x_i^{t+1} = x_i^t + w_{xi} \frac{\partial U}{\partial x_i}$$

$$y_i^{t+1} = y_i^t + w_{yi} \frac{\partial U}{\partial y_i}$$

where w is a factor that will be discussed later.

Convergence is reached when all the displacements fall below a set treshold.

The derivatives are straightforward to compute and are:

$$\frac{\partial U}{\partial x_i} = \sum_{j=N_i} (\hat{d}_{ij} - d_{ij}) \frac{(x_i - x_j)}{d_{ij}}$$

$$\frac{\partial U}{\partial y_i} = \sum_{j=N_i} (\hat{d}_{ij} - d_{ij}) \frac{(y_i - y_j)}{d_{ij}}$$

Note that these derivatives could be also rewritten as the resultant of the forces exerted to each one of the nodes 144 by all the springs 142 connected each particular node.

Regarding the convergence properties of the iterative optimization procedure, it can be shown that convergence is achieved when $$w_{xi} = \frac{w}{\frac{\partial^2 U}{\partial x_i}}$$

(similarly for $y_i$) and 0<w<2.

A fitting experiment has confirmed this.

The relaxation process described above behaves well and has been shown to approximate the surface very precisely. This is somewhat surprising, because the set of points 95 is not used during the mesh relaxation. The basis for this surprising result lies in the highly constrained nature of a developable surface or its discrete approximation such as the mesh 110 with the contstraint that for each node i, $d_{ij}$= const. When the mesh is initialized onto the data, the nodes do not satify this constraint. However, the relaxation procedure causes nodes to be displaced orthogonally to satisfy the contraints. The form of the surface does not change dramatically, which would be the case if the displacements were tangent. This key observation is what makes the relaxing mesh approximate the surface without data.

Once the mesh is fitted properly to the three-dimensional data, the next phase is to texture-map the initial planar mesh. As we mentioned before, with this technique there is no need to unroll the surface just fitted, because we already have it to start with.

Figure 22:
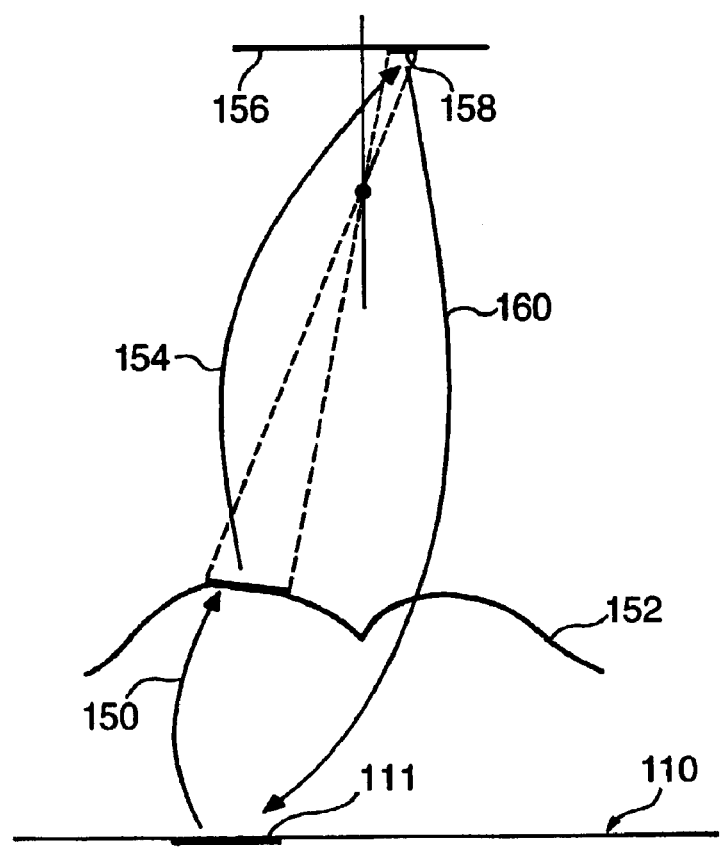
FIG. 22 shows a process of texture-mapping the relaxed mesh to de-warp the curled image of the document.

Texture-mapping to de-warp the curled document consists of three phases, which are illustrated in FIG. 22. First, all tiles 111 in the planar mesh 110 are initialized and relaxed 150 to the characterised document surface 152 such as to keep isometry. Using the known imaging geometry, the tile 111, which now lies on the three-dimensional surface 152, is back-projected 154 to the image plane 156 so as to obtain the texture 158 from the image that correspond to it. The final phase is to warp 160 the tile texture back 158 to its corresponding planar tile 111 so as to restore the texture as if it had been captured originally in a flat state.

Once the tile mapping has been computed as above, the warp stage 160 is a standard process and a number of excellent algorithms are described by George Wolberg in an book titled *Digital Image Warping*, published by IEEE Computer Society Press, 1991.

The document curl characterisation approach described above works well regardless of the paper type and document complexity. The invention provides a practical and cheap means of characterising and de-warping page curl. In particular, the profile of the imaged document is determined by projecting a known two-dimensional structured light pattern and triangulating with the image of the pattern taken by the camera. The use of a two-dimensional pattern, as opposed to a single stripe or point, is particularly desirable in this applications because it does not require expensive moving parts (and their drivers) and allows quick characterisation of the page-curl in a single shot, not by sweeping a single beam over the page.

In this example, the stripes are identified only from images of the plain stripes, without moving either the detector array or the lights stripe projector or imposing any kind of temporal or spatial modulation, which would increase heavily on the system cost.

The method described above for characterising document curl is practical and fast and can be implemented with relatively inexpensive hardware for a document imaging application using a platenless document imaging system. The invention may, however, be used with other types of imaging systems, such as those in platen-based devices such as photocopiers and flatbed scanners.

The document curl correction method presented above uses a mathematical model of paper, and an effective initialization and relaxation process for fitting this model to the data in a way that naturally produces an undistorted image. This is accomplished despite the fact that there are a large number of degrees of freedom and a large number of constraints that need to be satisfied with sparse and noisy data. This method has the ability to interpolate, extrapolate and self-complete wherever data is missing. The method produces high quality de-warped images of curled documents by modelling paper deformation in a physically realistic way.

What is claimed is:

1. An imaging system for imaging a document, comprising:
    a support surface for a document to be imaged,
    a light stripe projector arranged to project a plurality of diverging sheets of light that extend from the projector towards the support surface for forming a series of stripes across the document, a camera having a detector array for capturing an image of the document and of light stripes projected onto the document, and a processor arranged to receive from the detector array data representative of images of the document and of the light stripes and to calculate therefrom a three-dimensional profile of the document relative to a reference surface, and wherein the relative divergence of adjacent sheets of light varies laterally across the sheets so that the stripes are concentrated where the divergence is relatively low.

2. An imaging system as claimed in claim 1, in which at least one of the sheets of light is non-planar with a variable divergence from an adjacent sheet.

3. An imaging system as claimed in claim 2, in which there is a planar sheet of light with diverging sheets either side of the planar sheet.

4. An imaging system as claimed in claim 3, in which the diverging sheets bow towards the planar sheet.

5. An imaging system as claimed in claim 4, in which the sheets of light are symmetric about a plane that is transverse to the planar sheet and which comprises a median ray of the planar sheet.

6. An imaging system as claimed in claim 1, in which the camera and light stripe projector are mounted together on a support that rises above an edge of the support surface.

7. An imaging system as claimed in claim 6, in which the light stripe projector is below the camera.

8. An imaging system as claimed in claim 1, in which the light stripes are individually indistinguishable, and the processor is adapted to identify individual stripes by determining their position within the series of stripes.

9. An imaging system as claimed in claim 1, in which the light stripes are made individually distinguishable by spatial modulation.

10. A method of imaging a document using a document imaging system comprising a support surface a light stripe projector, a camera having a detector array, a processor, in which the method comprises the steps of:

i) placing the document on the support surface;

ii) using the light stripe projector to project a plurality of diverging sheets of light that extend from the projector towards the document;

iii) arranging the light stripe projector so that the sheets of light fall on the document to produce a series of light stripes on the document;

iv) using the camera to capture with the detector array an image of the document and of light stripes projected onto the document;

v) sending from the detector array to the processor data representative of the captured image of the document and of the light stripes; and vi) using the processor to calculate therefrom a three-dimensional profile of the document relative to a reference surface;

wherein the light stripe projector projects adjacent sheets of light with a relative divergence that varies laterally across the sheets so that the stripes are concentrated on the document where the divergence is relatively low.

* * * * *